(12) United States Patent
Yamauchi et al.

(10) Patent No.: US 7,950,809 B2
(45) Date of Patent: May 31, 2011

(54) HOLOGRAM ELEMENT, ILLUMINATION DEVICE, PROJECTOR, AND METHOD OF MANUFACTURING HOLOGRAM ELEMENT

(75) Inventors: Taisuke Yamauchi, Suwa (JP); Takashi Takeda, Suwa (JP); Takahiro Totani, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 602 days.

(21) Appl. No.: 12/079,485

(22) Filed: Mar. 27, 2008

(65) Prior Publication Data
US 2008/0239244 A1 Oct. 2, 2008

(30) Foreign Application Priority Data

Mar. 27, 2007 (JP) ................................. 2007-080869
Jan. 28, 2008 (JP) ................................. 2008-015876

(51) Int. Cl.
*G03B 21/14* (2006.01)
*G03H 1/22* (2006.01)
*G03H 1/02* (2006.01)

(52) U.S. Cl. ................. 353/94; 353/31; 359/10; 359/15

(58) Field of Classification Search ............ 353/31, 353/33, 34, 37, 94; 359/10, 15, 22, 23, 24, 359/25, 27, 28; 349/5, 7, 8, 9
See application file for complete search history.

(56) References Cited

U.S. PATENT DOCUMENTS

| | | | |
|---|---|---|---|
| 7,104,652 B2 | 9/2006 | Kojima | |
| 7,429,110 B2 | 9/2008 | Inoko | |
| 7,583,875 B2 * | 9/2009 | Yamauchi et al. | 385/37 |
| 7,798,650 B2 * | 9/2010 | Miller | 353/31 |
| 7,847,993 B2 * | 12/2010 | Yamauchi | 359/25 |
| 2008/0204609 A1 | 8/2008 | Inoko | |
| 2010/0002196 A1 * | 1/2010 | Lu et al. | 353/31 |
| 2010/0020289 A1 * | 1/2010 | Kamijima | 353/31 |
| 2010/0284180 A1 * | 11/2010 | Popovich et al. | 362/231 |

FOREIGN PATENT DOCUMENTS

| | | |
|---|---|---|
| CN | 2679709 Y | 2/2005 |
| CN | 1749807 A | 3/2006 |
| JP | 05-232319 A | 9/1993 |
| JP | 06-258630 A | 9/1994 |
| JP | 09-185048 A | 7/1997 |
| JP | 2001-305652 A | 11/2001 |
| JP | 2004-184821 A | 7/2004 |
| JP | 2006-084820 | 3/2006 |
| JP | 2007-033576 | 2/2007 |
| WO | WO-97-13175 A | 4/1997 |

* cited by examiner

*Primary Examiner* — William C Dowling
(74) *Attorney, Agent, or Firm* — AdvantEdge Law Group, LLC

(57) ABSTRACT

A hologram element that forms a predetermined illumination pattern on an irradiated surface by diffracting incident light is disclosed. The illumination pattern is formed by making light in a first wavelength region diffracted in a first region, and the illumination pattern is formed by making light in a second wavelength region different from the first wavelength region diffracted in a second region on the same plane as the first region.

15 Claims, 11 Drawing Sheets

PROCESS a

PROCESS b

PROCESS c

HOLOGRAM ELEMENT, ILLUMINATION DEVICE, PROJECTOR, AND METHOD OF MANUFACTURING HOLOGRAM ELEMENT

BACKGROUND

1. Technical Field

The present invention relates to a hologram element, an illumination device, a projector, and a method of manufacturing a hologram element and more particularly, to a technique of a hologram element used in an illumination device of a projector.

2. Related Art

In recent years, a projector is becoming smaller in size. A spatial light modulation device, for example, a liquid crystal display device is also becoming smaller as a projector is becoming smaller. In the case of a transmissive liquid crystal display device that transmits light, a rate of a black matrix serving as a light shielding portion between pixels increases as the liquid crystal display device becomes smaller. As a result, an aperture ratio decreases. On the other hand, in the case of a reflective liquid crystal display device that reflects light, a control line for every pixel is disposed below a reflection electrode. Accordingly, it is possible to make a gap between pixels extremely small. A decrease in opening ratio can be reduced by making the gap between pixels small. In addition, in the case of using a reflective liquid crystal display device, an optical system may also be reduced in size by adopting a configuration in which light is emitted by using the same optical path as light incident on the reflective liquid crystal display device. From those described above, it can be said that the reflective liquid crystal display device is suitable for miniaturization of a projector. A technique of a projector using a reflective liquid crystal display device is proposed in JP-A-2006-84820, for example.

A technique of using a laser light source as a light source of a projector has been recently proposed. As compared with an ultra-high pressure mercury lamp (UHP lamp) that has been used as a light source of a projector in the related art, the laser light source is advantageous in high color reproducibility, instant lighting, a long life, and the like. A hologram element can be used in an illumination device using a laser light source. In the hologram element, shaping and enlargement of an illuminated region and equalization of the light amount distribution in the illuminated region may be performed simultaneously by diffracting a laser beam. The hologram element can correctly perform shaping of an illuminated region, equalization of the light amount distribution in the illuminated region uniform, and the like by adopting a configuration corresponding to the wavelength of diffracted light. In the case of displaying an image with a plurality of color light components, a hologram element for every color light component is used to achieve reliable optical performance.

In the case of combining a hologram element and a reflective liquid crystal display device, it is difficult to adopt a configuration in which light is emitted by using the same optical path as light incident on the reflective liquid crystal display device, and an optical path from a laser light source to the reflective liquid crystal display device is required for every color light component. Since an optical path from the laser light source to the reflective liquid crystal display device is required for every color light component, it is difficult to realize a compact optical system. As described above, in the known techniques, there is a problem that satisfactory optical performance with respect to light components in a plurality of wavelength regions and miniaturization of a structure where a hologram element is provided are difficult to be compatible with each other.

SUMMARY

An advantage of some aspects of the invention is that it provides a hologram element capable of obtaining reliable optical performance with respect to light components in a plurality of wavelength regions and suitable for a compact configuration, an illumination device using the hologram element, a projector, and a method of manufacturing a hologram element.

According to an aspect of the invention, there is provided a hologram element that forms a predetermined illumination pattern on an irradiated surface by diffracting incident light. The illumination pattern is formed by making light in a first wavelength region diffracted in a first region, and the illumination pattern is formed by making light in a second wavelength region different from the first wavelength region diffracted in a second region on the same plane as the first region.

By making the light in the first wavelength region and the light in the second wavelength region diffracted in the first and second regions on the same plane, respectively, the illumination device can be formed with a smaller number of components than a case where a hologram element is disposed for every wavelength region and a space can be saved. In addition, it is possible to obtain reliable optical performance with respect to light components in a plurality of wavelength regions by adopting a configuration of diffracting light components in different wavelength regions for every region. Thus, it is possible to achieve reliable optical performance with respect to light components in a plurality of wavelength regions and to obtain a hologram element suitable for a compact configuration.

Furthermore, in the hologram element described above, preferably, a plurality of protruding portions are formed in the first region and the second region, the protruding portion provided in the first region has a length set in the direction approximately perpendicular to the plane with a first unit length corresponding to the first wavelength region as a unit, and the protruding portion provided in the second region has a length set in the direction approximately perpendicular to the plane with a second unit length corresponding to the second wavelength region as a unit. Thus, a configuration of diffracting light components having different wavelengths for every region is realized and the reliable optical performance with respect to light components having a plurality of wavelengths is obtained.

Furthermore, according to another aspect of the invention, an illumination device includes: a light source portion that supplies coherent light; and the above-described hologram element that diffracts the coherent light. By using the above-described hologram element, it is possible to achieve the reliable optical performance with respect to light components having a plurality of wavelengths and to realize a compact configuration. As a result, a high-performance and compact illumination device can be obtained.

Furthermore, in the illumination device described above, preferably, the light source portion includes a first light source portion that supplies coherent light in the first wavelength region and a second light source portion that supplies coherent light in the second wavelength region different from the first wavelength region, and the hologram element forms the illumination pattern by making the coherent light in the first wavelength region diffracted in a first region and forms the illumination pattern by making the coherent light in the second wavelength region diffracted in the second region on the same plane as the first region. Thus, it is possible to obtain the hologram element having reliable optical performance with respect to the coherent light in the first wavelength region and the coherent light in the second wavelength region.

Furthermore, in the illumination device described above, it is preferable to further include a light separating portion that separates the coherent light in the first wavelength region from the hologram element and the coherent light in the second wavelength region from each other. Thus, it is possible to make coherent light in the first wavelength region from the hologram element and coherent light in the second wavelength region move in different directions.

Furthermore, in the illumination device described above, preferably, the first light source portion supplies coherent light that is first polarized light having a first oscillating direction, the second light source portion supplies coherent light that is second polarized light having a second oscillating direction approximately perpendicular to the first oscillating direction, and the light separating portion includes a polarized light separating portion that reflects the first polarized light and transmits the second polarized light. Thus, it is possible to separate coherent light in the first wavelength region from coherent light in the second wavelength region.

Furthermore, in the illumination device described above, preferably, the light source portion includes a third light source portion that supplies coherent light in a third wavelength region different from the first wavelength region and the second wavelength region, the hologram element forms the illumination pattern by making the coherent light in the third wavelength region diffracted in a third region on the same plane as the first region and the second region, and the light separating portion includes a first light separating portion that separates the coherent light in the first wavelength region and the coherent light in the third wavelength region from the coherent light in the second wavelength region and a second light separating portion that separates the coherent light in the first wavelength region from the coherent light in the third wavelength region. By making it possible to supply light components in three wavelength regions, a configuration suitable for application of image display is realized. By adopting a configuration using one hologram element with respect to light components in three wavelength regions, the illumination device can have a compact configuration having a small number of components compared with a case where a plurality of hologram elements are used.

Furthermore, in the illumination device described above, preferably, the second light separating portion includes a wavelength separating portion that transmits the coherent light in the first wavelength region and reflects the coherent light in the third wavelength region. Thus, it is possible to separate coherent light in the first wavelength region from coherent light in the third wavelength region.

Furthermore, in the illumination device described above, preferably, the light source portion includes a third light source portion that supplies coherent light in a third wavelength region different from the first wavelength region and the second wavelength region, and the hologram element includes a first hologram element that diffracts the coherent light in the first wavelength region and the coherent light in the second wavelength region and a second hologram element that diffracts the coherent light in the third wavelength region. By making it possible to supply light components in three wavelength regions, a configuration suitable for application of image display is realized. By adopting a configuration using two hologram elements with respect to light components in three wavelength regions, the illumination device can have a compact configuration having a small number of components compared with a case where three hologram elements are used. In addition, it is possible to reduce the shift amount of diffracted light with respect to an optical axis of the hologram element, as compared with a case of diffracting light components in respective wavelength regions with one hologram element. As a result, it is possible to increase the diffraction efficiency.

Furthermore, in the illumination device described above, preferably, the hologram element makes first-order diffracted light incident on an irradiated surface. Furthermore, it is preferable that the hologram element makes only the first-order diffracted light incident on the irradiated surface. In the configuration in which first-order diffracted light and zero-order diffracted light are simultaneously incident on an irradiated surface, if the light amount of the zero-order diffracted light is larger than that of the first-order diffracted light, there is a case where only a part of an illuminated region is bright since the zero-order diffracted light and the first-order diffracted light overlap each other. By adopting a configuration in which only the first-order diffracted light is incident, it is possible to make the light amount distribution uniform. Thus, light having the uniform light amount distribution can be supplied.

Furthermore, in the illumination device described above, preferably, the first light source portion and the second light source portion make the coherent light in the first wavelength region and the coherent light in the second wavelength region, which are arranged in parallel in the specific direction along the plane, incident on the hologram element, and the hologram element makes the first-order diffracted light, which is shifted from an optical axis of the hologram element within a plane approximately perpendicular to the specific direction, incident on the irradiated surface. In this case, it is possible to make equal the shift amount of the first-order diffracted light from the optical axis of the hologram element regarding each coherent light in the first wavelength region and the second wavelength region. Thus, approximately the same diffraction efficiency can be obtained regarding each coherent light in the first wavelength region and the second wavelength region.

Furthermore, according to still another aspect of the invention, a projector includes: the above-described illumination device; and a spatial light modulation device that modulates light from the illumination device according to an image signal. By using the illumination device described above, a high-performance and compact configuration can be realized. As a result, a bright and high-quality image can be displayed and a compact projector can be obtained.

Furthermore, in the projector described above, preferably, the illumination device includes: a first light source portion that supplies coherent light in a first wavelength region; a second light source portion that supplies coherent light in a second wavelength region different from the first wavelength region; a hologram element that forms a predetermined illumination pattern on an irradiated surface by diffracting the coherent light from the first light source portion and the second light source portion; and a light separating portion that separates the coherent light in the first wavelength region from the hologram element and the coherent light in the second wavelength region from each other. Preferably, the spatial light modulation device includes a first spatial light modulation device that modulates the coherent light in the first wavelength region according to an image signal and a second spatial light modulation device that modulates the coherent light in the second wavelength region according to an image signal, the first spatial light modulation device modulates the coherent light in the first wavelength region from the light separating portion and makes the modulated coherent light incident on the light separating portion, the second spatial light modulation device modulates the coherent light in the second wavelength region from the light separating portion and makes the modulated coherent light incident on the light separating portion, and the light separating portion mixes the coherent light in the first wavelength region from the first spatial light modulation device with the coherent light in the second wavelength region from the second spatial light modulation device and makes the mixed light move in the direction of a projected surface. In this case, the coherent light in the first wavelength region and the coherent light in the second wavelength region can be emitted by using the same optical path as when being incident on the spatial light modulation device. As a result, a compact configuration can be realized.

Furthermore, in the projector described above, preferably, the illumination device includes a third light source portion that supplies coherent light in a third wavelength region different from the first wavelength region and the second wavelength region, the hologram element forms the illumination pattern by diffracting the coherent light from the third light source portion, the spatial light modulation device includes a third spatial light modulation device modulates the coherent light in the third wavelength region according to an image signal, the light separating portion includes a first light separating portion that separates the coherent light in the first wavelength region and the coherent light in the third wavelength region from the coherent light in the second wavelength region and a second light separating portion that separates the coherent light in the first wavelength region from the coherent light in the third wavelength region, the first spatial light modulation device modulates the coherent light in the first wavelength region from the second light separating portion and makes the modulated light incident on the second light separating portion, the third spatial light modulation device modulates the coherent light in the third wavelength region from the second light separating portion and makes the modulated light incident on the second light separating portion, the second light separating portion mixes the coherent light in the first wavelength region from the first spatial light modulation device with the coherent light in the third wavelength region from the third spatial light modulation device and makes the mixed light move in the direction of the first light separating portion, the second spatial light modulation device modulates the coherent light in the second wavelength region from the first light separating portion and makes the modulated light incident on the first light separating portion, and the first light separating portion mixes the coherent light in the first wavelength region from the second light separating portion, the coherent light in the third wavelength region, and the coherent light in the second wavelength region from the second spatial light modulation device and makes the mixed light move in the direction of the projected surface. Thus, the coherent light in the first wavelength region, the coherent light in the second wavelength region, and the coherent light in the third wavelength region can be emitted by using the same optical path as when being incident on the spatial light modulation device.

Furthermore, in the projector described above, preferably, the illumination device includes a third light source portion that supplies coherent light in a third wavelength region different from the first wavelength region and the second wavelength region. Preferably, the hologram element includes: a first hologram element that diffracts the coherent light in the first wavelength region and the coherent light in the second wavelength region; a second hologram element that diffracts the coherent light in the third wavelength region; and a light mixing portion provided at the position where the coherent light in the third wavelength region from the second hologram element is incident. Preferably, the spatial light modulation device includes a third spatial light modulation device that modulates the coherent light in the third wavelength region from the light mixing portion according to an image signal, the light separating portion separates the coherent light in the first wavelength region from the first hologram element and the coherent light in the second wavelength region from each other, the third spatial light modulation device modulates the coherent light in the third wavelength region from the light mixing portion and makes the modulated light incident on the light mixing portion, and the light mixing portion mixes the coherent light in the first wavelength region from the light separating portion, the coherent light in the second wavelength region, and the coherent light in the third wavelength region from the third spatial light modulation device and makes the mixed light move in the direction of the projected surface. Thus, the coherent light in the first wavelength region, the coherent light in the second wavelength region, and the coherent light in the third wavelength region can be emitted by using the same optical path as when being incident on the spatial light modulation device.

In addition, according to still another aspect of the invention, a method of manufacturing a hologram element having a predetermined illumination pattern formed on an irradiated surface by diffracting incident light includes: performing a first mold forming process for forming a first mold having a plurality of protruding portions which are formed on a first flat surface and each of which has a length set in the direction approximately perpendicular to the first flat surface with a first unit length corresponding to a first wavelength region as a unit; performing a second mold forming process for forming a second mold having a plurality of protruding portions which are formed on a second flat surface and each of which has a length set in the direction approximately perpendicular to the second flat surface with a second unit length corresponding to a second wavelength region different from the first wavelength region as a unit; performing a parallelizing process for arranging the first mold and the second mold in parallel; and performing a transferring process for transferring shapes of the first and second molds, which are arranged in parallel in the parallelizing process, to a material member. Thus, a hologram element capable of diffracting light components having different wavelengths for every region can be easily manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings.

First Embodiment

Figure 1:
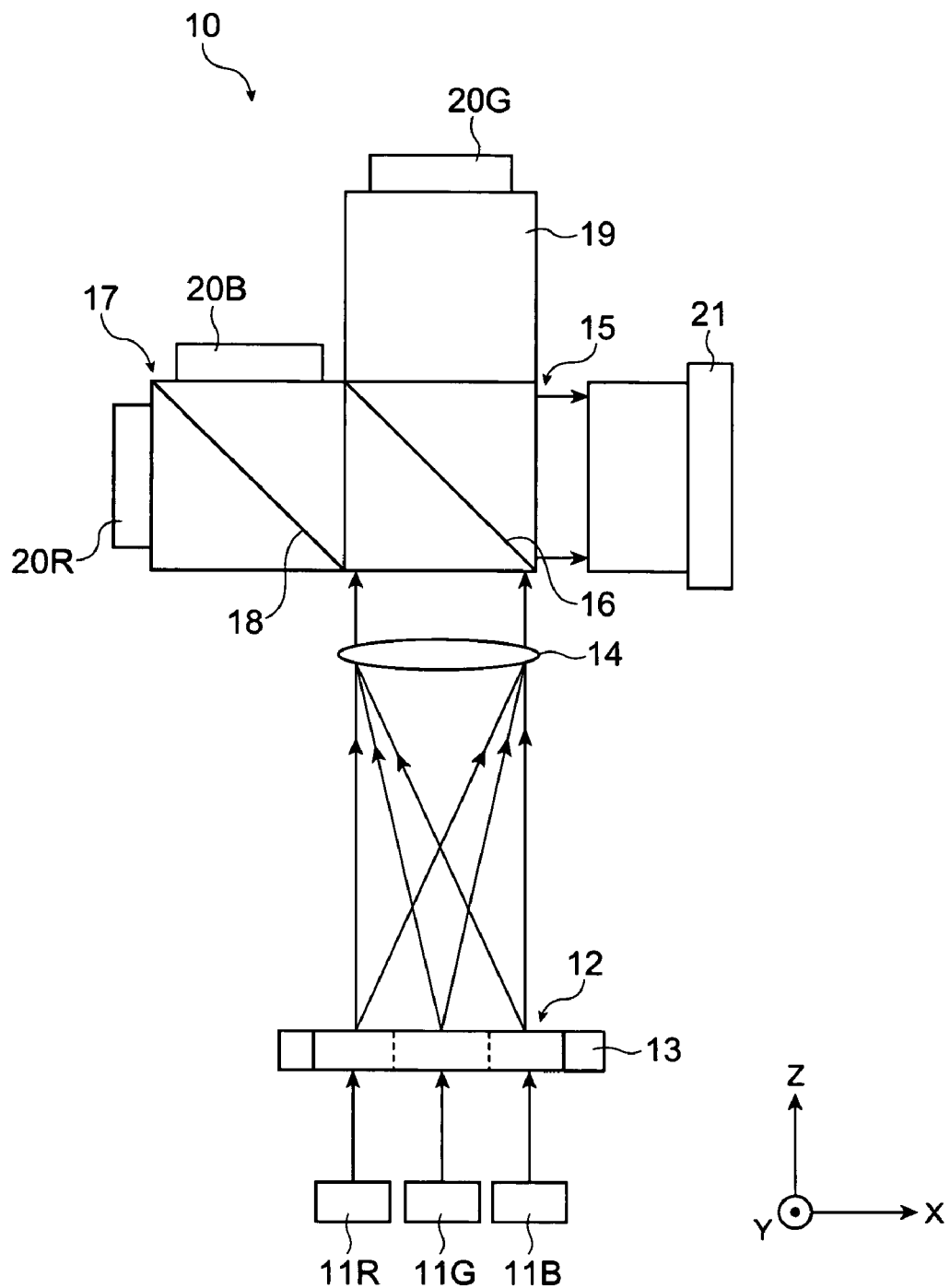
FIG. 1 is a view schematically illustrating the configuration of a projector according to a first embodiment of the invention.

FIG. 1 is a view schematically illustrating the configuration of a projector 10 according to a first embodiment of the invention. The projector 10 is a front projection type projector that supplies light onto a screen (not shown) and allows a viewer to enjoy an image by observing the light reflected from the screen. The projector 10 has a light source portion 11R for red (R) light, a light source portion 11G for green (G) light, and a light source portion 11B for blue (B) light. The light source portion 11R for R light, the light source portion 11G for G light, and the light source portion 11B for B light are light source portions that supply laser beams which are coherent light.

The light source portion 11R for R light is a first light source portion that supplies R light which is a laser beam in a first wavelength region. The light source portion 11G for G light is a second light source portion that supplies G light which is a laser beam in a second wavelength region different from the first wavelength region. The light source portion 11B for B light is a third light source portion that supplies B light which is a laser beam in a third wavelength region different from the first wavelength region and the second wavelength region. The light source portion 11R for R light, the light source portion 11G for G light, and the light source portion 11B for B light each have semiconductor lasers. The light source portion 11R for R light and the light source portion 11B for B light supply first polarized light having a first oscillating direction. The first polarized light is s-polarized light, for example. The light source portion 11G for G light supplies second polarized light having a second oscillating direction. The second polarized light is p-polarized light, for example.

Laser beams from the light source portions 11R, 11G, and 11B for respective color light components are incident on the hologram element 12. The hologram element 12 forms a predetermined illumination pattern on an irradiated surface by diffracting coherent light from the light source portions 11R, 11G, and 11B for respective color light components.

The irradiated surface is an incidence surface of each of spatial light modulation devices 20R, 20G, and 20B for respective color light components. A laser beam incident on the hologram element 12 has a beam shape that forms a spot in an approximately circular shape. In addition, a laser beam incident on the hologram element 12 shows a light amount distribution such that the light amount is maximal at the center of the spot and the light amount is decreased as being separated from the center of the spot. On the other hand, the hologram element 12 forms an illumination pattern of a rectangular shaped and uniform light amount distribution on the irradiated surface. The hologram element 12 performs shaping and enlargement of an illuminated region and equalization of the light amount distribution in the illuminated region.

A laser beam from the hologram element 12 is transmitted through a field lens 14 and is then incident on a polarized light separating portion 15. The field lens 14 makes laser beams from the hologram element 12 parallel to each other. The polarized light separating portion 15 is a first light separating portion for separating R light and B light from G light. The polarized light separating portion 15 is formed by bonding two rectangular prisms together. A polarized light separating film 16 is coated between the two rectangular prisms. The polarized light separating film 16 is a dielectric multi-layered film, for example. The polarized light separating portion 15 serves to make s-polarized light, which is the first polarized light, reflected from the polarized light separating film 16 and p-polarized light, which is the second polarized light, transmitted through the polarized light separating film 16. The polarized light separating portion 15 may have not only a cube shape but also a plate shape.

A wavelength separating portion 17 is provided at a side of the polarized light separating portion 15 not facing a projection lens 21. The wavelength separating portion 17 is a second light separating portion for separating R light from B light. The wavelength separating portion 17 is formed by bonding two rectangular prisms together. A wavelength separating film 18 is coated between the two rectangular prisms. The wavelength separating film 18 is a dielectric multi-layered film, for example. The wavelength separating portion 17 serves to make the R light, which is a laser beam in the first wavelength region, transmitted through the wavelength separating film 18 and the B light, which is a laser beam in the third wavelength region, reflected from the wavelength separating film 18. The wavelength separating portion 17 may have not only a cube shape but also a plate shape. The light source portions 11R, 11G, and 11B for respective color light components, the hologram element 12, the field lens 14, the polarized light separating portion 15, the wavelength separating portion 17, and a prism 19 form an illumination device.

The spatial light modulation device 20R for R light is provided on a surface of the wavelength separating portion 17 not facing the polarized light separating portion 15. The spatial light modulation device 20B for B light is provided at the position symmetrical to the spatial light modulation device 20R for R light with respect to the wavelength separating film 18. The spatial light modulation device 20R for R light is a first spatial light modulation device that modulates R light from the illumination device according to an image signal. The spatial light modulation device 20R for R light modulates the R light from the wavelength separating portion 17 and makes the modulated R light incident on the wavelength separating portion 17. The spatial light modulation device 20B for B light is a third spatial light modulation device that modulates B light from the illumination device according to an image signal. The spatial light modulation device 20B for B light modulates the B light from the wavelength separating portion 17 and makes the modulated B light incident on the wavelength separating portion 17.

The prism 19 is provided at a side of the polarized light separating portion 15 not facing the field lens 14. The spatial light modulation device 20G for G light is provided on a surface of the prism 19 not facing the polarized light separating portion 15. The spatial light modulation device 20G for G light is a second spatial light modulation device that modulates G light from the illumination device according to an image signal. The spatial light modulation device 20G for G light modulates G light transmitted from the polarized light separating portion 15 through the prism 19 and makes the modulated G light incident on the polarized light separating portion 15 through the prism 19. The spatial light modulation device 20R for R light, the spatial light modulation device 20B for B light, and the spatial light modulation device 20G for G light are reflective liquid crystal display devices (liquid crystal on silicon: LCOS). In addition, in the projector 10, a space may be provided in a portion corresponding to the prism 19 without providing the prism 19. The projection lens 21 makes each of the color light components, which are modulated by the spatial light modulation devices 20R, 20G, and 20B for respective color light components, to be projected.

Figure 2:
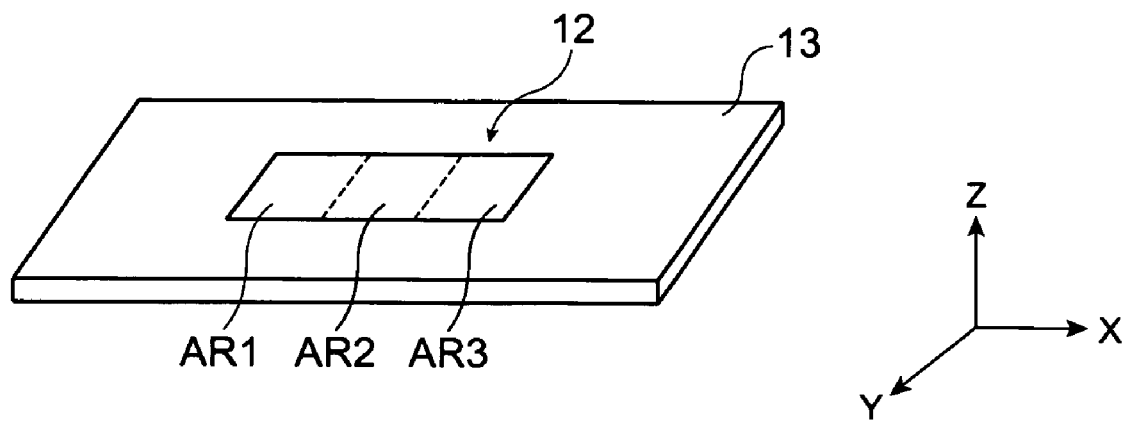
FIG. 2 is a view illustrating the configuration of a hologram element.

FIG. 2 is a view illustrating the configuration of the hologram element 12. The hologram element 12 is supported by a supporting portion 13. The hologram element 12 includes a first region AR1, a second region AR2, and a third region AR3. The first region AR1, the second region AR2, and the third region AR3 are positioned on the same plane, that is, an Xy plane. The Z direction is a direction approximately perpendicular to the plane. The light source portion 11R (refer to FIG. 1) for R light makes the R light incident on the first region AR1. The hologram element 12 diffracts the R light in the first region AR1. The light source portion 11G (refer to FIG. 1) for G light makes the G light incident on the second region AR2. The hologram element 12 diffracts the G light in the second region AR2. The light source portion 11B (refer to FIG. 1) for B light makes the B light incident on the third region AR3. The hologram element 12 diffracts the B light in the third region AR3.

Figure 3:
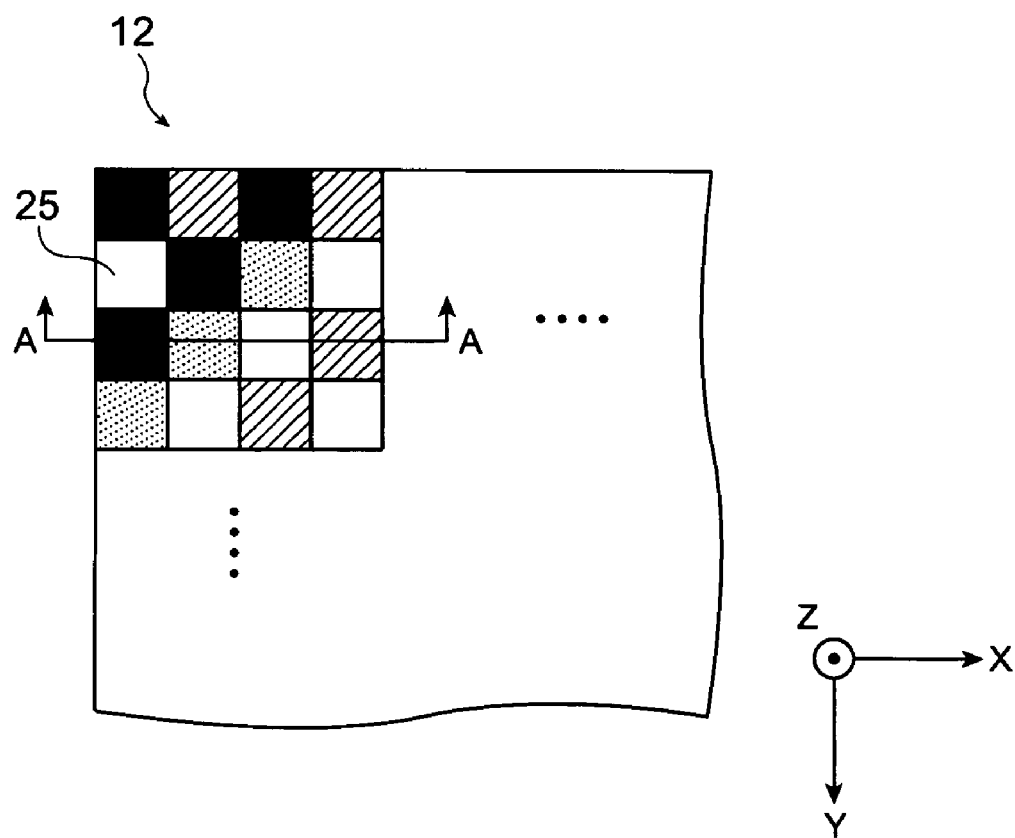
FIG. 3 is a view schematically illustrating the surface configuration of a hologram element.
Figure 4:
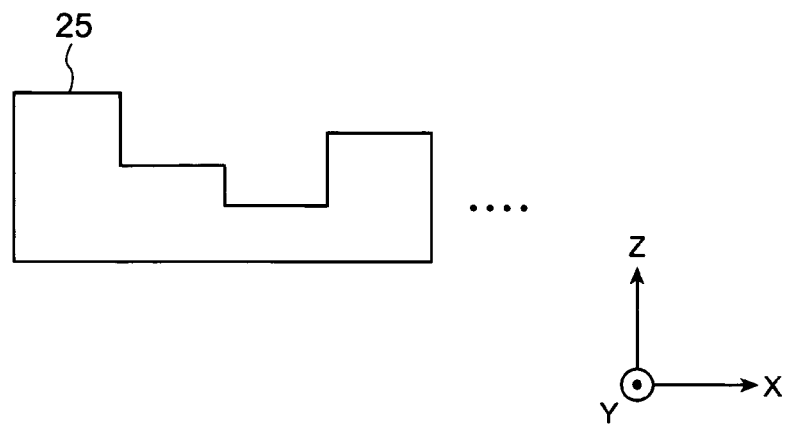
FIG. 4 is a cross-sectional view taken along the line IV-IV of FIG. 3.

FIG. 3 is a view schematically illustrating the surface configuration of the hologram element 12. FIG. 4 is a cross-sectional view taken along the line IV-IV of FIG. 3. A plurality of protruding portions 25 are formed in the first region AR1, the second region AR2, and the third region AR3. The protruding portion 25 is a surface of the hologram element 12 and is provided on an emission surface from which light is emitted, for example. The protruding portion 25 has a rectangular shape within the XY plane. In FIG. 3, coloring of the protruding portion 25 indicates a difference in height. Here, FIG. 3 shows that the protruding portion 25 is formed as high as a portion colored with dark black, in other words, the protruding portion 25 is positioned at a front side of the plane of FIG. 3. The protruding portion 25 has a rectangular shape on the cross section shown in FIG. 4. The hologram element 12 changes the initial phase of a laser beam for every protruding portion 25. The hologram element 12 generates diffracted light by spatially changing the phase of a laser beam. Since a laser beam that is coherent light is incident on the hologram element 12, satisfactory diffraction characteristic can be obtained.

Figure 5:
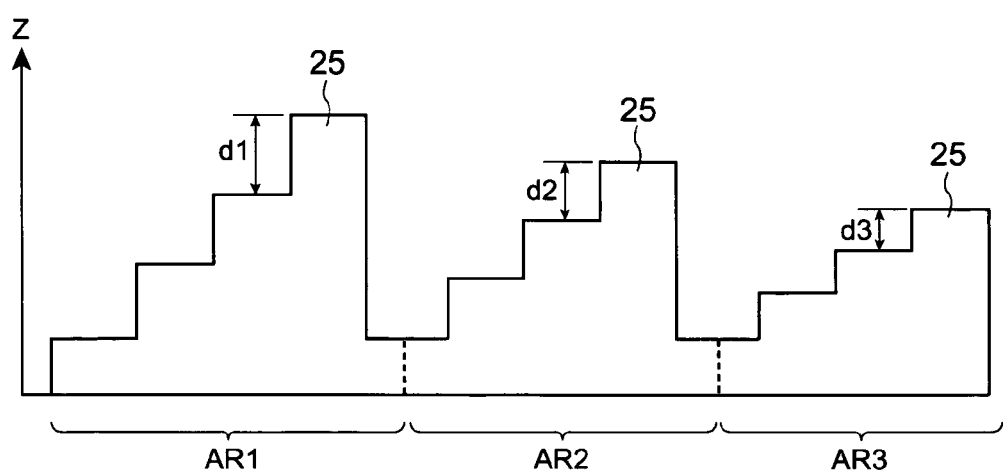
FIG. 5 is a view explaining setting of the length of a protruding portion in the Z direction.

FIG. 5 is a view explaining setting of the length of the protruding portion 25 in the Z direction. By using a first unit length d1 as a unit, the length of the protruding portion 25 provided in the first region AR1 in the Z direction is set. The first unit length d1 corresponds to the first wavelength region. By using a second unit length d2 as a unit, the length of the protruding portion 25 provided in the second region AR2 in the Z direction is set. The second unit length d2 corresponds to the second wavelength region. By using a third unit length d3 as a unit, the length of the protruding portion 25 provided in the third region AR3 in the Z direction is set. The third unit length d3 corresponds to the third wavelength region. The hologram element 12 can be configured to have a predetermined function by optimizing surface conditions including the length of the protruding portion 25 in the Z direction and a pitch and a pattern of the protruding portion 25 within the XY plane.

By diffracting the R light, the G light, and the B light in the first region AR1, the second region AR2, and the third region AR3 on the same plane, respectively, a smaller number of components are used as compared with a case where a hologram element is disposed for every wavelength region and a space can be saved. In addition, it is possible to obtain reliable optical performance with respect to light components in a plurality of wavelength regions by adopting a configuration of diffracting light components in different wavelength regions for every region. By adopting a configuration using one hologram element 12 with respect to light components in three wavelength regions, it is possible to realize a compact configuration having a small number of components compared with a case where a plurality of hologram elements are used. In addition, one polarized light separating film 16 required in an optical system may be used.

Figure 6:
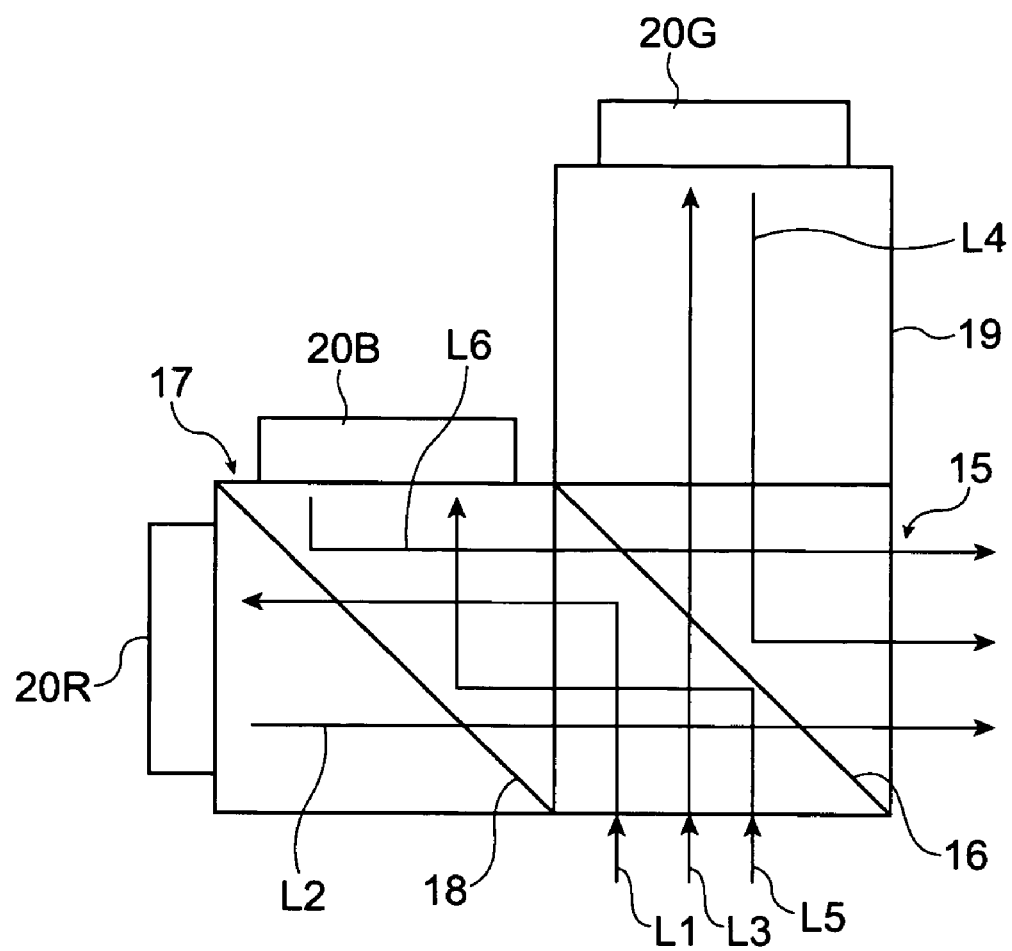
FIG. 6 is a view explaining separation and mixing of respective color light components.

FIG. 6 is a view explaining separation and mixing of respective color light components in the polarized light separating portion 15 and the wavelength separating portion 17. R light L1, G light L3, and B light L5 from the hologram element 12 are incident on the polarized light separating portion 15. An optical path of the R light L1 that is s-polarized light is bent by reflection from the polarized light separating film 16, and then the R light L1 is incident on the wavelength separating portion 17. The R light L1 incident on the wavelength separating portion 17 is transmitted through the wavelength separating film 18 and is then incident on the spatial light modulation device 20R for R light. R light L2, which has been converted from s-polarized light to p-polarized light by modulation in the spatial light modulation device 20R for R light, is transmitted through the wavelength separating portion 17 and is then incident on the polarized light separating portion 15. The R light L2 incident on the polarized light separating portion 15 is transmitted through the polarized light separating film 16 and moves in the direction of the projection lens 21 (refer to FIG. 1).

The G light L3 that is p-polarized light is transmitted through the polarized light separating film 16 and is then incident on the prism 19. The G light L3 transmitted through the prism 19 is incident on the spatial light modulation device 20G for G light. G light L4, which has been converted from p-polarized light to s-polarized light by modulation in the spatial light modulation device 20G for G light, is transmitted through the prism 19 and is then incident on the polarized light separating portion 15. The length of an optical path of the G light can be made equal to those of the R light and the B light by providing the prism 19. An optical path of the G light L4 incident on the polarized light separating portion 15 is bent by reflection from the polarized light separating film 16, and then the G light L4 moves in the direction of the projection lens 21.

An optical path of the B light L5 that is s-polarized light is bent by reflection from the polarized light separating film 16, and then the B light L5 is incident on the wavelength separating portion 17. The optical path of the B light L5 incident on the wavelength separating portion 17 is bent by reflection from the wavelength separating film 18, and then the B light L5 is incident on the spatial light modulation device 20B for B light. An optical path of B light L6, which has been converted from s-polarized light to p-polarized light by modulation in the spatial light modulation device 20B for B light, is bent by reflection from the wavelength separating film 18, and then the B light L6 is incident on the polarized light separating portion 15. The wavelength separating portion 17 causes the R light L2 from the spatial light modulation device 20R for R light and the B light L6 from the spatial light modulation device 20B for B light to be mixed to move in the direction of the polarized light separating portion 15. The B light L6 incident on the polarized light separating portion 15 is transmitted through the polarized light separating film 16 and moves in the direction of the projection lens 21. The polarized light separating portion 15 causes the R light L2 from the spatial light modulation device 20R for R light, the B light L6 from the spatial light modulation device 20B for B light, and the G light L4 from the spatial light modulation device 20G for G light to be mixed to move in the direction of a screen (not shown) that is a projected surface.

By using the above-described hologram element 12, it is possible to achieve reliable optical performance with respect to light components having a plurality of wavelengths and to realize an illumination device having a compact configuration. In addition, it is possible to realize a configuration of emitting light by causing respective color light components to use the same optical path as when being incident on the spatial light modulation device. Thus, since high performance and compact configuration can be realized, an effect that a bright and high-quality image can be displayed is obtained.

It is sufficient that the projector 10 has a configuration capable of emitting light by using the same optical path as when being incident on the spatial light modulation device. That is, the configuration of the projector 10 is not limited to that in the present embodiment. For example, R, G, and B may be exchanged on the basis of the configuration described in the present embodiment. A polarization property of the polarized light separating portion 15 may be arbitrarily set according to the configuration of the projector 10 without being limited to reflecting s-polarized light and transmitting p-polarized light. A wavelength property of the wavelength separating portion 17 may be arbitrarily set according to the configuration of the projector 10 without being limited to transmitting R light and reflecting B light.

Each of the light source portions 11R, 11G, and 11B for respective color light components may also have a configuration using a wavelength conversion element that converts the wavelength of a laser beam from a semiconductor laser, for example, a second-harmonic generation (SHG) element. A diode pumped solid state (DPSS) laser, a solid state laser, a liquid laser, a gas laser, and the like may also be used as the light source portions 11R, 11G, and 11B for respective color light components instead of the semiconductor laser.

The hologram element 12 can be manufactured by pattern transfer using a mold, for example. First, a resist is coated on a quartz substrate and then an electron beam is irradiated onto the resist with an electron beam exposure apparatus to thereby perform patterning of the resist. Then, a mold formed of quartz is formed by performing etching processing. Then, the substrate and the mold for forming the hologram element 12, such as a film-like member formed of a synthetic resin, are heated up to the glass transition temperature or more of a substrate. After holding the substrate and the mold for a predetermined period of time in a state where the substrate and the mold are pressed against each other, the substrate and the mold are cooled up to the glass transition temperature or less of the substrate and then the substrate and the mold are detached from each other. Thus, the hologram element 12 having a desired shape transferred onto the substrate is formed.

As described above, the hologram element 12 can be formed by forming a mold and then heat transferring the shape of the mold onto a substrate, that is, by using a so-called nano-imprinting technique. In addition, the manufacturing method described herein is only an example, and any kind of technique may be used as long as the hologram element 12 having a desired shape can be manufactured.

Second Embodiment

Figure 7:
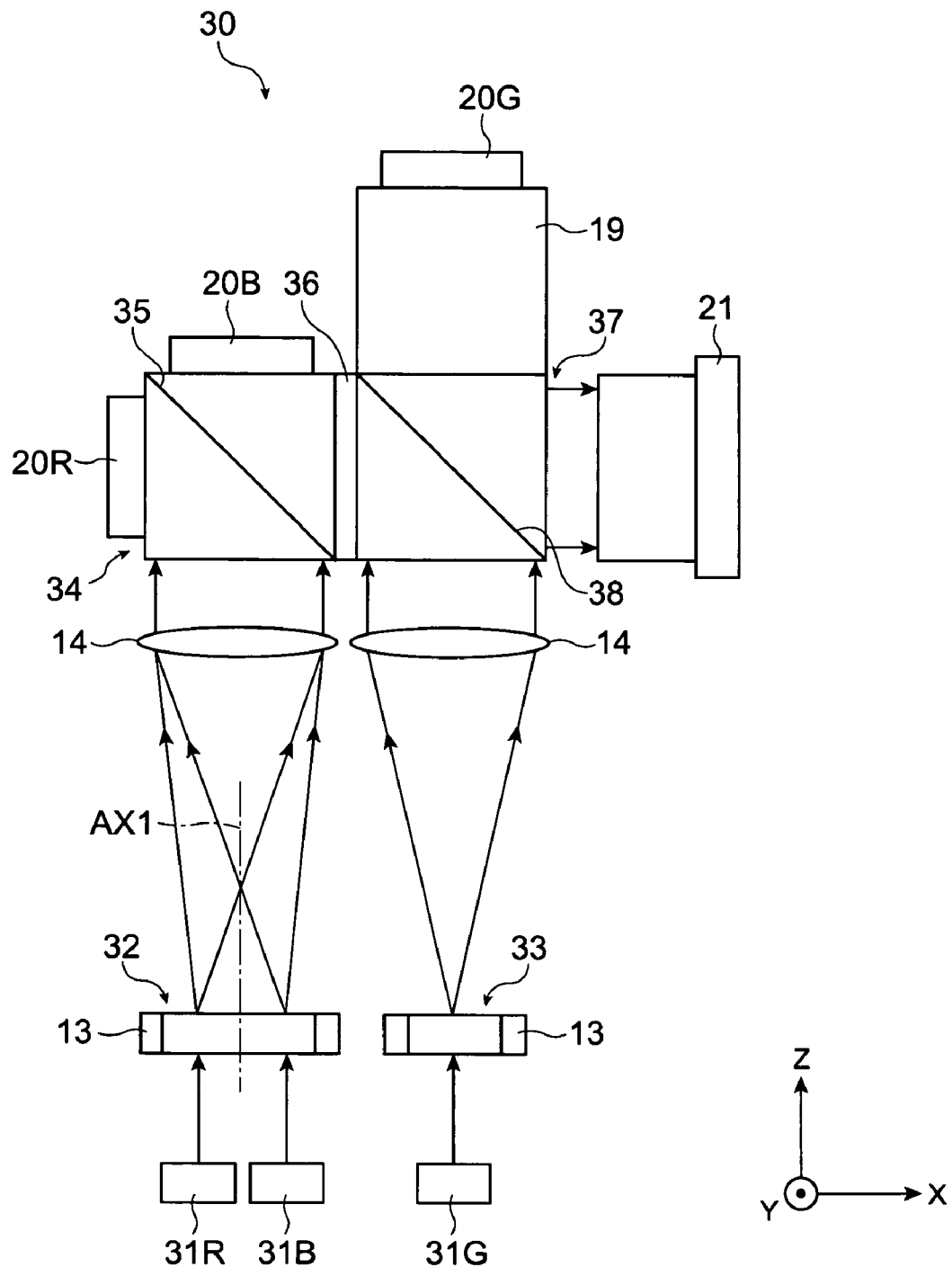
FIG. 7 is a view schematically illustrating the configuration of a projector according to a second embodiment of the invention.

FIG. 7 is a view schematically illustrating the configuration of a projector 30 according to a second embodiment of the invention. The projector 30 according to the present embodiment has a first hologram element 32 and a second hologram element 33. The same components as in the first embodiment are denoted by the same reference numerals, and a detailed description thereof will be omitted.

A light source portion 31R for R light is a first light source portion that supplies R light which is a laser beam in a first wavelength region. A light source portion 31B for B light is a second light source portion that supplies B light which is a laser beam in a second waveguide region different from the first wavelength region. A light source portion 31G for G light is a third light source portion that supplies G light which is a laser beam in a third wavelength region different from the first wavelength region and the second wavelength region. The light source portion 31R for R light, the light source portion 31G for G light, and the light source portion 31B for B light each have semiconductor lasers. The light source portion 31R for R light supplies first polarized light having a first oscillating direction. The first polarized light is s-polarized light, for example. The light source portion 31B for B light and the light source portion 31G for G light supply second polarized light having a second oscillating direction. The second polarized light is p-polarized light, for example.

R light from the light source portion 31R for R light and B light from the light source portion 31B for B light are incident on the first hologram element 32. The first hologram element 32 forms a predetermined illumination pattern on an irradiated surface by diffracting R light from the light source portion 31R for R light and B light from the light source portion 31B for B light. The first hologram element 32 performs shaping and enlargement of an illuminated region and equalization of the light amount distribution in the illuminated region. The first hologram element 32 diffracts the R light in the first region. In addition, the first hologram element 32 diffracts the B light in the second region on the same plane as the first region. The R light and the B light from the first hologram element 32 are transmitted through a field lens 14 and are then incident on a polarized light separating portion 34. The polarized light separating portion 34 is provided at the position where the R light and the B light transmitted from the first hologram element 32 through the field lens 14 are incident.

G light from the light source portion 31G for G light is incident on the second hologram element 33. The second hologram element 33 performs shaping and enlargement of an illuminated region and equalization of the light amount distribution in the illuminated region. The second hologram element 33 makes the G light diffracted. The G light from the second hologram element 33 is transmitted through the field lens 14 and is then incident on a light mixing portion 37. The light mixing portion 37 is provided at the position where the G light transmitted from the second hologram element 33 through the field lens 14 is incident.

The polarized light separating portion 34 is a light separating portion for separating the R light and the B light from the first hologram element 32 from each other. The polarized light separating portion 34 is formed by bonding two rectangular prisms together. A polarized light separating film 35 is coated between the two rectangular prisms. The polarized light separating film 35 is a dielectric multi-layered film, for example. The polarized light separating portion 34 serves to make s-polarized light, which is the first polarized light, reflected from the polarized light separating film 35 and p-polarized light, which is the second polarized light, to be transmitted through the polarized light separating film 35. The light mixing portion 37 mixes the R light, the B light, and the G light. The light mixing portion 37 is formed by bonding two rectangular prisms together. A polarized light separating film 38 is coated between the two rectangular prisms. The polarized light separating film 38 is a dielectric multi-layered film, for example. The light mixing portion 37 serves to make s-polarized light, which is the first polarized light, reflected from the polarized light separating film 38 and p-polarized light, which is the second polarized light, to be transmitted through the polarized light separating film 38. The polarized light separating portion 34 and the light mixing portion 37 may have not only a cube shape but also a plate shape.

A wavelength selection polarization conversion portion 36 is provided between the polarized light separating portion 34 and the light mixing portion 37. The wavelength selection polarization conversion portion 36 converts the B light, which is s-polarized light, into p-polarized light and allows the R light, which is p-polarized light, to be transmitted therethrough. For example, the 'color select' manufactured by Color Link Inc., U.S. can be used as the wavelength selection polarization conversion portion 36. The light source portions 31R, 31B, and 31G for respective color light components, the first hologram element 32, the second hologram element 33, the two field lenses 14, the polarized light separating portion 34, the wavelength selection polarization conversion portion 36, the light mixing portion 37, and the prism 19 form an illumination device.

A spatial light modulation device 20R for R light is provided on a side of the polarized light separating portion 34 not facing the wavelength selection polarization conversion portion 36. The spatial light modulation device 20R for R light is a first spatial light modulation device that modulates R light from the illumination device according to an image signal. The spatial light modulation device 20R for R light modulates the R light from the polarized light separating portion 34 and makes the modulated R light incident on the polarized light separating portion 34. The spatial light modulation device 20B for B light is provided at the position symmetrical to the spatial light modulation device 20R for R light with respect to the polarized light separating film 35. The spatial light modulation device 20B for B light is a second spatial light modulation device that modulates B light from the illumination device according to an image signal. The spatial light modulation device 20B for B light modulates the B light from the polarized light separating portion 34 and makes the modulated B light incident on the polarized light separating portion 34.

The prism 19 is provided at a side of the light mixing portion 37 not facing the field lens 14. The spatial light modulation device 20G for G light is provided on a surface of the prism 19 not facing the light mixing portion 37. The spatial light modulation device 20G for G light is a third spatial light modulation device that modulates G light from the illumination device according to an image signal. The spatial light modulation device 20G for G light modulates G light transmitted from the light mixing portion 37 through the prism 19 and makes the modulated G light incident on the light mixing portion 37 through the prism 19.

By adopting a configuration using the two hologram elements 32 and 33 with respect to light components in three wavelength regions, it is possible to realize a compact configuration having a small number of components compared with a case where three hologram elements are used. Furthermore, in the first hologram element 32, it is possible to reduce the shift amount of diffracted light with respect to an optical axis AX1 of the first hologram element 32, as compared with a case of diffracting light components in three wavelength regions with one hologram element. As a result, it is possible to increase the diffraction efficiency.

Figure 8:
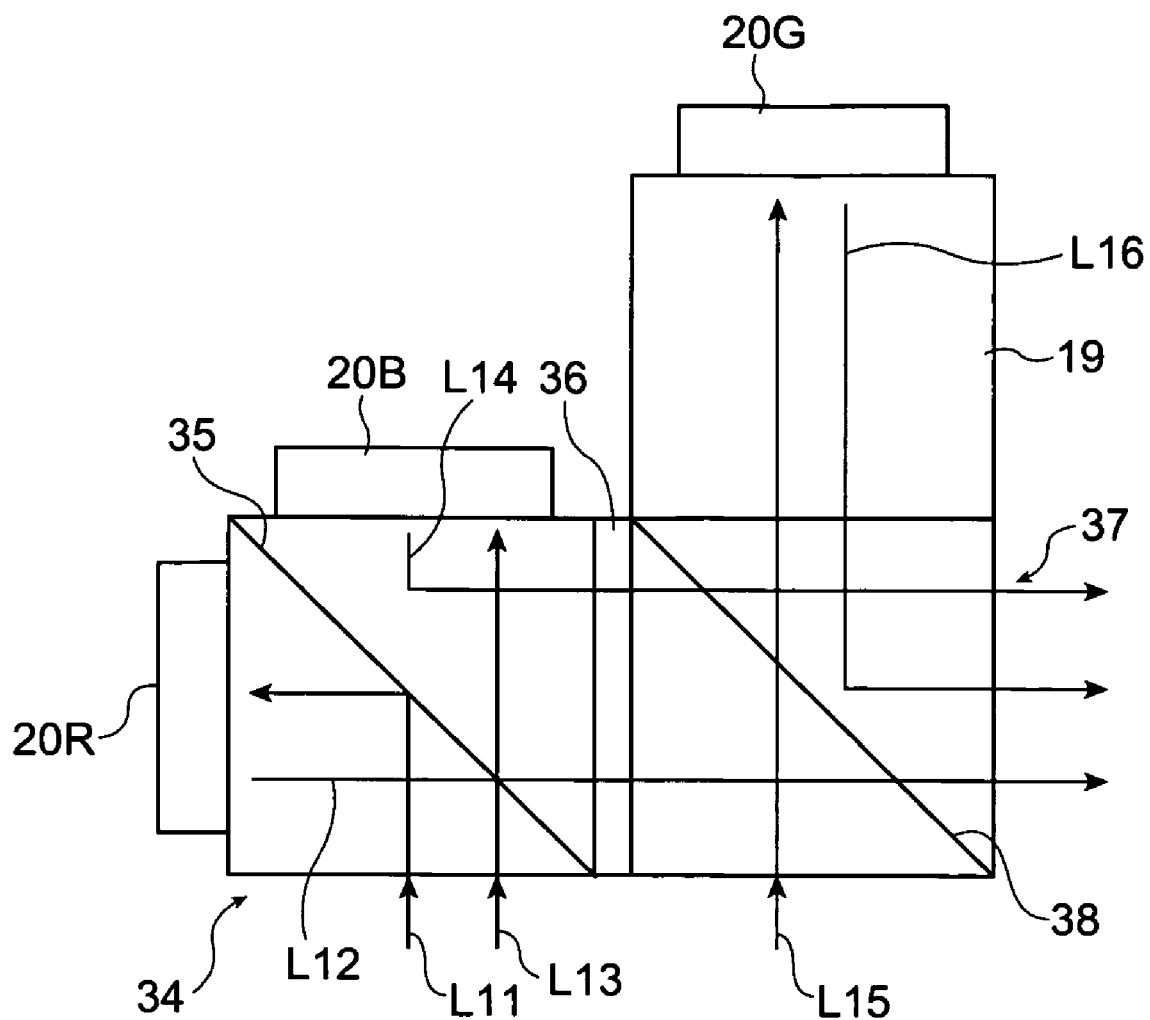
FIG. 8 is a view explaining separation and mixing of respective color light components.

FIG. 8 is a view explaining separation and mixing of respective color light components in the polarized light separating portion 34 and the light mixing portion 37. R light L11 and B light L13 from the first hologram element 32 are incident on the polarized light separating portion 34. An optical path of the R light L11 that is s-polarized light is bent by reflection from the polarized light separating film 35, and then the R light L11 is incident on the spatial light modulation device 20R for R light. R light L12, which has been converted from s-polarized light to p-polarized light by modulation in the spatial light modulation device 20R for R light, is transmitted through the polarized light separating film 35. The R light L12 emitted from the polarized light separating portion 34 is transmitted through the wavelength selection polarization conversion portion 36 and is then incident on the light mixing portion 37. The R light L12 incident on the light mixing portion 37 is transmitted through the polarized light separating film 38 and moves in the direction of a projection lens 21 (refer to FIG. 7).

B light L13 that is p-polarized light is transmitted through the polarized light separating film 35 and is then incident on the spatial light modulation device 20B for B light. An optical path of B light L14, which has been converted from p-polarized light to s-polarized light by modulation in the spatial light modulation device 20B for B light, is bent by reflection from the polarized light separating film 35, and then the B light L14 is incident on the wavelength selection polarization conversion portion 36. The B light L14 incident on the wavelength selection polarization conversion portion 36 is converted from s-polarized light into p-polarized light. The B light L14 converted into p-polarized light is transmitted through the polarized light separating film 38 and moves in the direction of the projection lens 21. The polarized light separating portion 34 causes the R light L12 from the spatial light modulation device 20R for R light and the B light L14 from the spatial light modulation device 20B for B light to be mixed to move in the direction of the light mixing portion 37.

G light L15 from the second hologram element 33 is incident on the light mixing portion 37. The G light L15 that is p-polarized light is transmitted through the polarized light separating film 38 and is then incident on the prism 19. The G light L15 transmitted through the prism 19 is incident on the spatial light modulation device 20G for G light. G light L16, which has been converted from p-polarized light to s-polarized light by modulation in the spatial light modulation device 20G for G light, is transmitted through the prism 19 and is then incident on the light mixing portion 37. An optical path of the G light L16 incident on the light mixing portion 37 is bent by reflection from the polarized light separating film 38, and then the G light L16 moves in the direction of the projection lens 21. The light mixing portion 37 causes the R light L12 from the spatial light modulation device 20R for R light, the B light L14 from the spatial light modulation device 20B for B light, and the G light L16 from the spatial light modulation device 20G for G light to be mixed to move in the direction of a screen (not shown) that is a projected surface.

By using the above-described hologram elements 32 and 33, it is possible to achieve reliable optical performance with respect to light components having a plurality of wavelengths and to realize an illumination device having a compact configuration. In addition, it is possible to realize a configuration of emitting light by causing respective color light components to use the same optical path as when being incident on the spatial light modulation device. Also in the present embodiment, a bright and high-quality image can be displayed since high performance and compact configuration are realized. Also in the present embodiment, for example, R, G, and B may be exchanged on the basis of the configuration described in the present embodiment. Polarization properties of the polarized light separating portion 34 and the light mixing portion 37 may be arbitrarily set according to the configuration of the projector 30 without being limited to reflecting s-polarized light and transmitting p-polarized light. A wavelength property and a polarization property of the wavelength selection polarization conversion portion 36 may be arbitrarily set according to the configuration of the projector 30 without being limited to performing polarization conversion of only B light of R light and B light.

Third Embodiment

Figure 9:
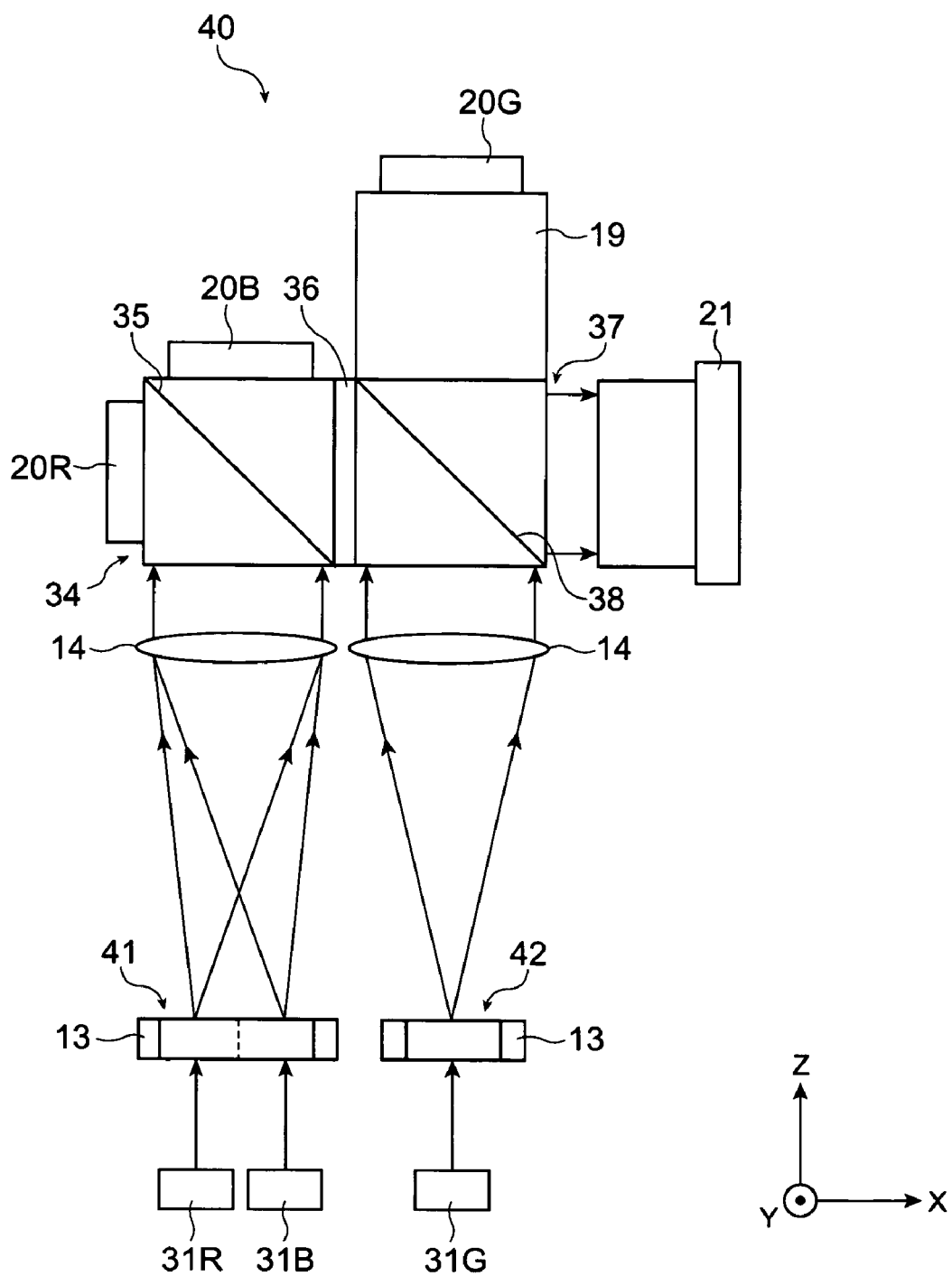
FIG. 9 is a view schematically illustrating the configuration of a projector according to a third embodiment of the invention.

FIG. 9 is a view schematically illustrating the configuration of a projector 40 according to a third embodiment of the invention. The projector 40 according to the present embodiment is characterized in that first-order diffracted light is incident on an irradiated surface by hologram elements 41 and 42. The same components as in the second embodiment are denoted by the same reference numerals, and a detailed description thereof will be omitted.

Figure 10:
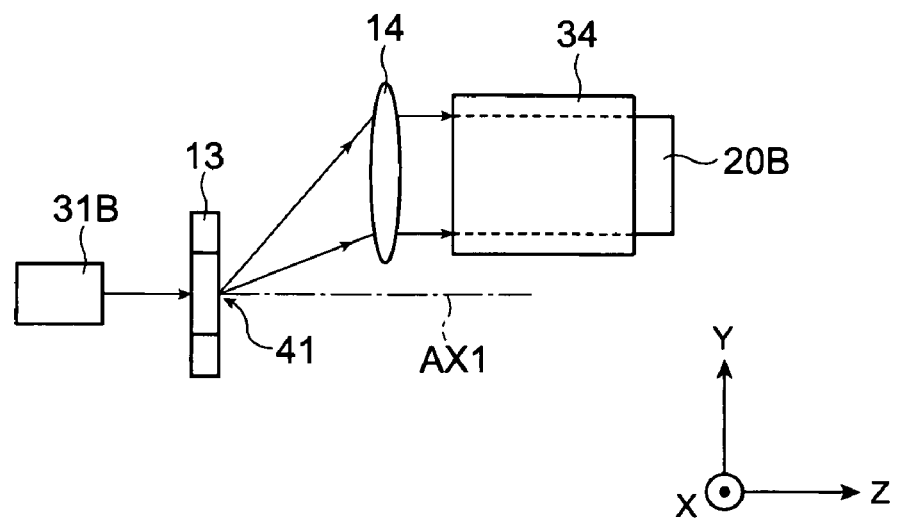
FIG. 10 is a view illustrating the YZ plane configuration of each component with respect to B light.

FIG. 10 is a view illustrating the YZ plane configuration of each component on an optical path from a light source portion 31B for B light to a spatial light modulation device 20B for B light. A light source portion 31R for R light is positioned at a back side (minus X side) of the light source portion 31B for B light as viewed from the plane in the drawing. A spatial light modulation device 20R for R light is positioned at a back side (minus X side) of the polarized light separating portion 34 as viewed from the plane in the drawing. The light source portion 31R for R light and the light source portion 31B for B light make the R light and the B light arranged in parallel in the X direction incident on the first hologram element 41. The X direction is a specific direction along an XY plane that is a flat surface.

The light source portion 31B for B light and the light source portion 31R for R light are disposed on the optical axis AX1 of the first hologram element 41 within a YZ plane. The light source portion 31B for B light, the light source portion 31R for R light, and the first hologram element 41 are disposed by shifting the optical axis AX1 from a polarized light separating portion 34. The first hologram element 41 makes only the first-order diffracted light, which is shifted from the optical axis AX1 within the YZ plane, incident on an irradiated surface. The YZ plane is a flat surface approximately perpendicular to the X direction that is a specific direction.

Figure 11:
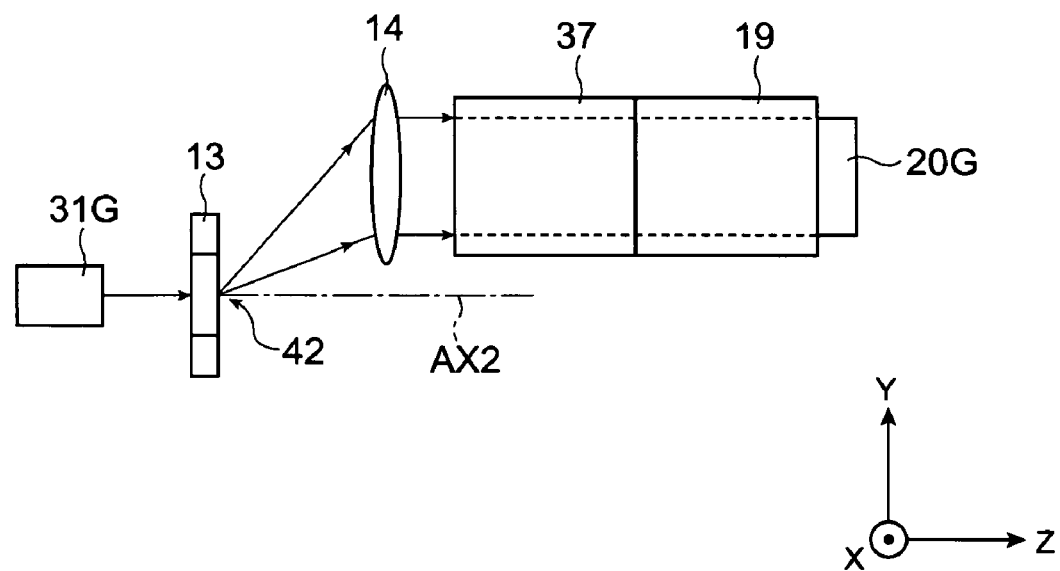
FIG. 11 is a view illustrating the YZ plane configuration of each component with respect to G light.

FIG. 11 is a view illustrating the YZ plane configuration of each component on an optical path from a light source portion 31G for G light to a spatial light modulation device 20G for G light. The light source portion 31G for G light is disposed on an optical axis AX2 of the second hologram element 42 within the YZ plane. The light source portion 31G for G light and the second hologram element 42 are disposed by shifting the optical axis AX2 from the light mixing portion 37. The second hologram element 42 makes only the first-order diffracted light, which is shifted from the optical axis AX2 within the YZ plane, incident on an irradiated surface. In the configuration in which first-order diffracted light and zero-order diffracted light are simultaneously incident on an irradiated surface, if the light amount of the zero-order diffracted light is larger than that of the first-order diffracted light, there is a case where only a part of an illuminated region is bright since the zero-order diffracted light and the first-order diffracted light overlap each other. By adopting a configuration in which only the first-order diffracted light is incident, it is possible to make the light amount distribution uniform. Thus, light having the uniform light amount distribution can be supplied.

Figure 12:
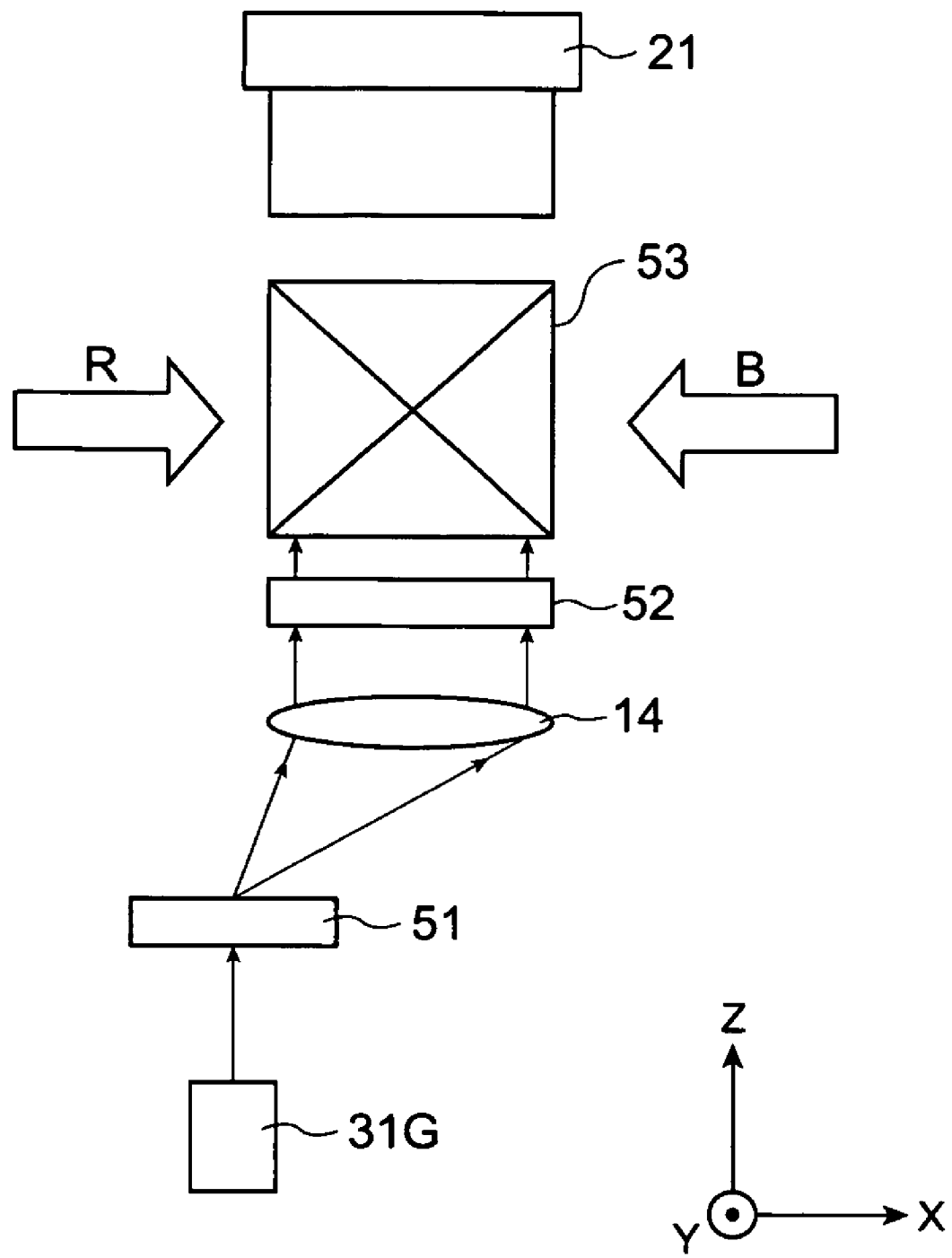
FIG. 12 is a view illustrating a comparative example of the third embodiment.

FIG. 12 is a view illustrating a configuration example of a case of using a transmissive spatial light modulation device 52, which is a comparative example of the present embodiment. First-order diffracted light from the hologram element 51 is incident on the spatial light modulation device 52 through a field lens 14. G light modulated by the spatial light modulation device 52 is mixed with R light and B light by a cross dichroic prism 53 and moves toward a projection lens 21. In this case, the first-order diffracted light may be configured to be shifted from an optical axis within an XZ plane where R light, G light, and B light are arranged in parallel.

On the other hand, in the case when the projector 40 according to the present embodiment shown in FIG. 9 is configured such that first-order diffracted light from the optical axes AX1 and AX2 within the XZ plane is shifted, the shift amount of the first-order diffracted light from the optical axes AX1 and AX2 becomes different for every color light component. In the case where the shift amount of the first-order diffracted light is different for every color light component, it is difficult to obtain the same diffraction efficiency for respective color light components. Like the present embodiment, it is possible to make the shift amount of the first-order diffracted light from the optical axes AX1 and AX2 equal by adopting a configuration of shifting the first-order diffracted light from the optical-axis AX1 and AX2 within the YZ plane. Thus, it is possible to obtain approximately the same diffraction efficiency for respective color light components.

In the projector according to each of the embodiments described above, a wavelength selection polarization conversion portion (Color Select) for making a polarizing direction for every color light component uniform is required in the case of using a lamp, such as a UHP lamp, instead of a laser light source. The wavelength selection polarization conversion portion is provided before a polarized light separating portion. For example, in the configuration shown in FIG. 1, the wavelength selection polarization conversion portion may be provided between the field lens 14 and the polarized light separating portion 15. In the configuration shown in FIG. 7, the wavelength selection polarization conversion portion may be provided between the field lens 14 and the polarized light separating portion 34 and may be provided between the field lens 14 and the light mixing portion 37 as needed. In the case of using a laser light source, it is possible to supply predetermined polarized light for every color light component, which is advantageous in that the wavelength selection polarization conversion portion is not needed.

The projector according to each of the embodiments described above may have a free polarizing plate provided between each light source portion for corresponding color light component and a hologram element. A free polarizing plate corresponding to each wavelength region can be used by adopting a configuration that allows first polarized light to be transmitted in the case of a light source portion that emits first polarized light and a configuration that allows second polarized light to be transmitted in the case of a light source portion that emits second polarized light. By using the free polarizing plate, it becomes possible to further increase the contrast.

The projector according to each of the embodiments described above may be configured to use, as a spatial light modulation device, a DMD (digital micromirror device) or the like other than a reflective liquid crystal display device. The projector may be configured to emit light by using the same optical path as light incident on a spatial light modulation device or may be configured to use a spatial light modulation device other than the reflective spatial light modulation device. The projector is not limited to the configuration in which a spatial light modulation device is used for every color light component. The projector may also be configured to modulate two or three or more color light components with one spatial light modulation device. The projector may also be a slide projector using a sliding having image information other than a configuration using a spatial light modulation device. The projector may also be a so-called rear projector that supplies light onto a surface of a screen and allows a viewer to enjoy an image by observing the light reflected from the other surface of the screen.

The illumination device according to the embodiment of the invention is not limited to the case applied to a projector. For example, the illumination device according to the embodiment of the invention may also be applied to a direct view type image display device that allows an image of a spatial light modulation device to be directly observed without using a projection optical system. In addition, the illumination device according to the embodiment of the invention may be applied to an exposure device, which performs exposure using a laser beam, or a monitor device that monitors an image illuminated by a laser beam. The illumination device according to the embodiment of the invention is not limited to supplying three color light components but may be configured to supply a plurality of laser beams in different wavelength regions. The hologram element according to the embodiment of the invention is not limited to performing shaping of an illuminated region and equalization of the light amount distribution. The hologram element according to the embodiment of the invention may perform at least one of the shaping of an illuminated region and equalization of the light amount distribution. In addition, the hologram element is not limited to the case of performing at least one of the shaping of an illuminated region and equalization of the light amount distribution but may perform branching, deflection, and the like of laser beams, for example. The hologram element according to the embodiment of the invention may be applied to all kinds of fields where a surface relief type hologram element is used, such as an optical system of a laser machine or an optical system for optical pickup in an optical disk reproducing apparatus.

Fourth Embodiment

Figure 13:
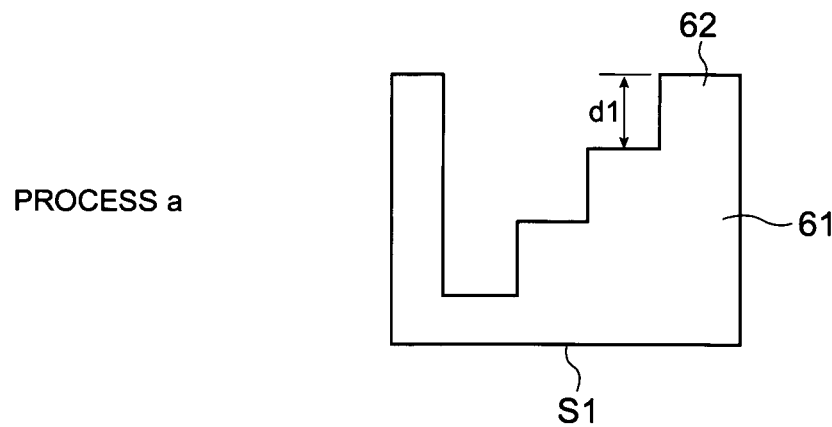
FIG. 13 is a view explaining procedures of manufacturing a hologram element according to a fourth embodiment of the invention.
Figure 13:
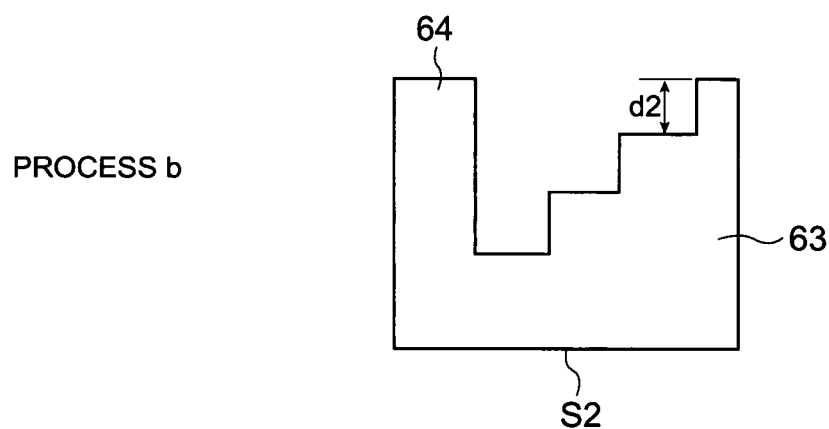
Figure 13:
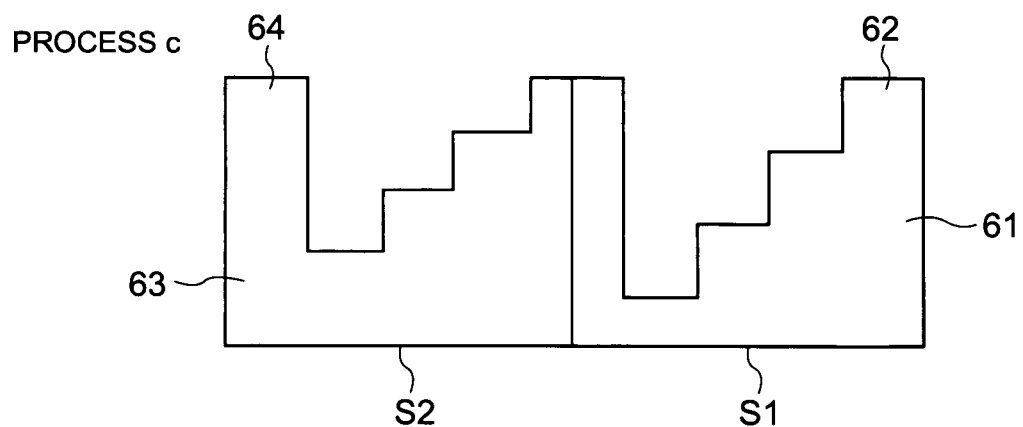
Figure 14:
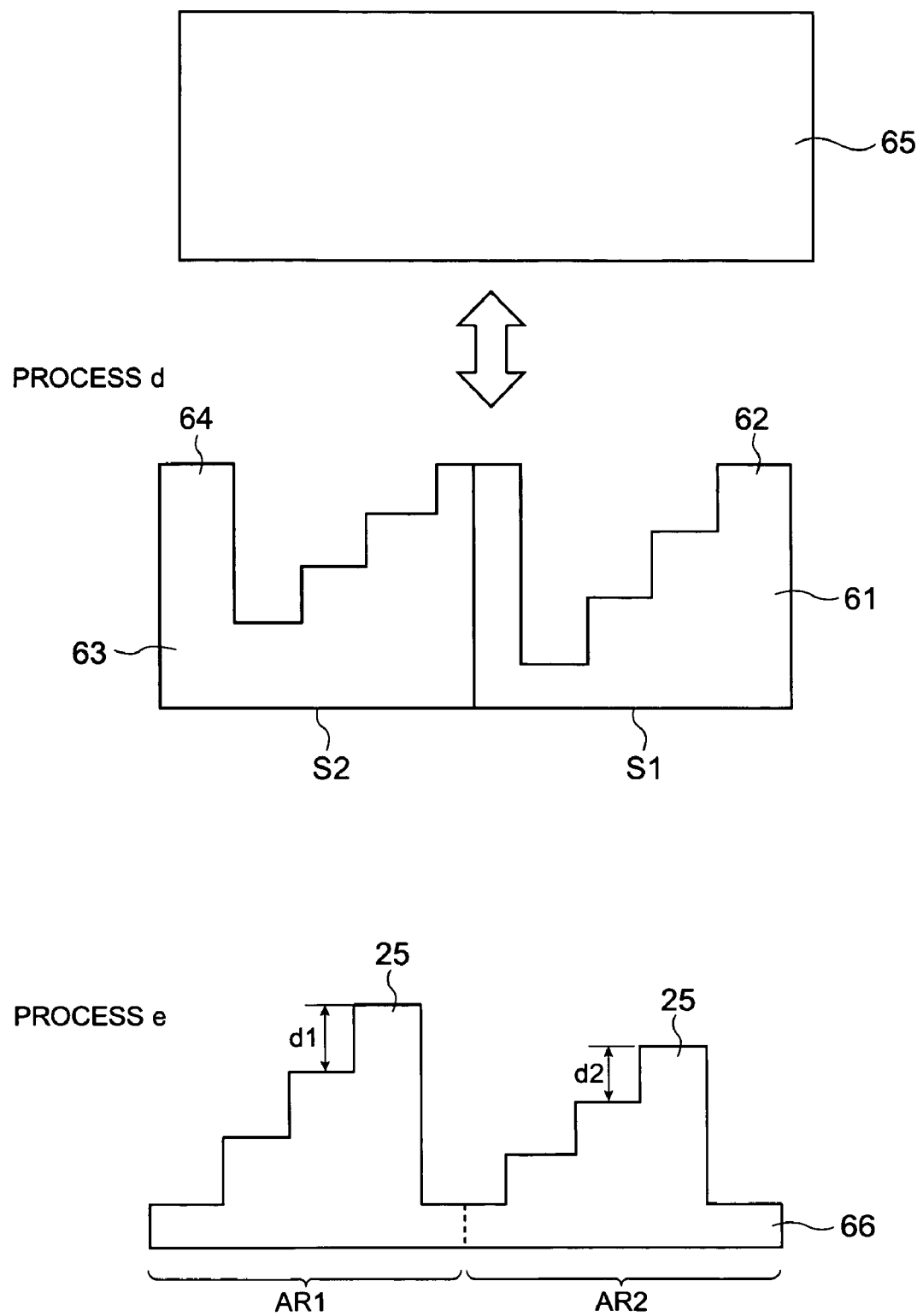
FIG. 14 is a view explaining procedures of manufacturing the hologram element according to the fourth embodiment of the invention.

FIGS. 13 and 14 are views explaining procedures of manufacturing a hologram element 66 by using a method of manufacturing a hologram element according to a fourth embodiment of the invention. A process a shown in FIG. 13 is a first mold forming process for forming a first mold 61 that is a first mold. The first mold 61 has a plurality of protruding portions 62 formed on a first flat surface S1. The first flat surface S1 is assumed to be a surface of the first mold 61 opposite a surface formed with the protruding portions 62. The protruding portion 62 has a length set in the direction approximately perpendicular to the first flat surface S1 with a first unit length d1 as a unit. The first unit length d1 corresponds to a first wavelength region.

The first mold 61 can be formed through exposure and etching, for example. For example, a resist is coated on a quartz substrate and then an electron beam is irradiated onto the resist with an electron beam exposure apparatus to thereby perform patterning of the resist. Then, the first mold 61 formed of quartz can be obtained by performing etching processing.

A process b is a second mold forming process for forming a second mold 63 that is a second mold. The second mold 63 has a plurality of protruding portions 64 formed on a second flat surface S2. The second flat surface S2 is assumed to be a surface of the second mold 63 opposite a surface formed with the protruding portions 64. The protruding portion 64 has a length set in the direction approximately perpendicular to the second flat surface S2 with a second unit length d2 as a unit. The second unit length d2 corresponds to the second wavelength region. The second mold 63 can be formed in the same manner as the first mold 61. The first mold 61 and the second mold 63 are formed by separate processes, respectively.

Then, the first mold 61 and the second mold 63 are made to arrange in parallel in a process c which is a parallelizing process. The first mold 61 and the second mold 63 are disposed such that the protruding portions 62 and 64 are arranged in parallel on approximately the same plane. In the present embodiment, the first mold 61 and the second mold 63 are disposed such that the first flat surface S1 and the second flat surface S2 are arranged in parallel on approximately the same plane. The first mold 61 and the second mold 63 may be supported by using a common supporting member, for example.

The shapes of the first mold 61 and the second mold 63 arranged in parallel in the process c are transferred to a material member 65 in a process d that is a transferring process. In the process d, for example, a nano-imprinting technique based on heat transfer may be used. The material member 65 is a thermoplastic resin member, for example. The first mold 61, the second mold 63, and the material member 65 are heated up to the glass transition temperature or more of the material member 65. The first mold 61 and the second mold 63 are pressed against the material member 65 softened by heating and this state is held for a predetermined period of time. The first mold 61, the second mold 63, and the material member 65 are cooled up to the glass transition temperature or less of the material member 65 and then the first mold 61 and the second mold 63 is detached from the material member 65. As a result, as shown in a process e, the hologram element 66 having the transferred shapes of the first mold 61 and the second mold 63 is completed.

The first mold 61 and the second mold 63 formed in separate processes can be easily manufactured as compared with a case of collectively forming molds each having a plurality of protruding portions with a unit length as a unit. Since a mold used in a transferring process can be easily manufactured, the hologram element 66 having the plurality of protruding portions 25 with a unit length as a unit can be easily manufactured. As a result, an effect that a hologram element capable of diffracting light components having different wavelengths for every region can be easily manufactured is obtained. The hologram element according to each of the embodiments, which diffracts light components having different wavelengths for every region, can be easily manufactured by using the manufacturing method described in the present embodiment.

In addition, a method other than the heat transfer may also be used in the transferring process. In the transferring process, for example, a nano-imprinting technique based on light transfer may also be used. In the case of light transfer, for example, a light curing resin is used as the material member 65. By curing the material member 65, against which the first mold 61 and the second mold 63 are pressed, by irradiation of ultra violet rays, the shapes of the first mold 61 and the second mold 63 can be transferred. Alternatively, in the transferring process, the shapes of the first mold 61 and the second mold 63 may be transferred by using a technique of injection molding.

As described above, the hologram element and the illumination device according to the embodiments of the invention are suitable for a case used in a projector.

The entire disclosure of Japanese Patent Application Nos: 2007-080869, filed Mar. 27, 2007 and 2008-015876, filed Jan. 28, 2008 are expressly incorporated by reference herein.

What is claimed is:

1. A hologram element that forms a predetermined illumination pattern on an irradiated surface by diffracting incident light,
wherein the illumination pattern is formed by making light in a first wavelength region diffracted in a first region, and the illumination pattern is formed by making light in a second wavelength region different from the first wavelength region diffracted in a second region on the same plane as the first region.

2. The hologram element according to claim 1,
wherein a plurality of protruding portions are formed in the first region and the second region,
the protruding portion provided in the first region has a length set in the direction approximately perpendicular to the plane with a first unit length corresponding to the first wavelength region as a unit, and
the protruding portion provided in the second region has a length set in the direction approximately perpendicular to the plane with a second unit length corresponding to the second wavelength region as a unit.

3. An illumination device comprising:
a light source portion that supplies coherent light; and
the hologram element according to claim 1 that diffracts the coherent light.

4. The illumination device according to claim 3,
wherein the first light source portion includes a first light source portion that supplies coherent light in the first wavelength region and a second light source portion that supplies coherent light in the second wavelength region different from the first wavelength region, and
the hologram element forms the illumination pattern by making the coherent light in the first wavelength region diffracted in a first region and forms the illumination pattern by making the coherent light in the second wavelength region diffracted in the second region on the same plane as the first region.

5. The illumination device according to claim 4, further comprising:
a light separating portion that separates the coherent light in the first wavelength region from the hologram element and the coherent light in the second wavelength region from each other.

6. The illumination device according to claim 5,
wherein the first light source portion supplies coherent light that is first polarized light having a first oscillating direction,
the second light source portion supplies coherent light that is second polarized light having a second oscillating direction approximately perpendicular to the first oscillating direction, and the light separating portion includes a polarized light separating portion that reflects the first polarized light and transmits the second polarized light.

7. The illumination device according to claim 4,
wherein the light source portion includes a third light source portion that supplies coherent light in a third wavelength region different from the first wavelength region and the second wavelength region,
the hologram element forms the illumination pattern by making the coherent light in the third wavelength region diffracted in a third region on the same plane as the first region and the second region, and
the light separating portion includes a first light separating portion that separates the coherent light in the first wavelength region and the coherent light in the third wavelength region from the coherent light in the second wavelength region and a second light separating portion that separates the coherent light in the first wavelength region from the coherent light in the third wavelength region.

8. The illumination device according to claim 7,
wherein the second light separating portion includes a wavelength separating portion that transmits the coherent light in the first wavelength region and reflects the coherent light in the third wavelength region.

9. The illumination device according to claim 4,
wherein the light source portion includes a third light source portion that supplies coherent light in a third wavelength region different from the first wavelength region and the second wavelength region, and
the hologram element includes a first hologram element that diffracts the coherent light in the first wavelength region and the coherent light in the second wavelength region and a second hologram element that diffracts the coherent light in the third wavelength region.

10. The illumination device according to claim 3,
wherein the hologram element makes first-order diffracted light incident on an irradiated surface.

11. The illumination device according to claim 10,
wherein the first light source portion and the second light source portion make the coherent light in the first wavelength region and the coherent light in the second wavelength region, which are arranged in parallel in the specific direction along the plane, incident on the hologram element, and
the hologram element makes the first-order diffracted light, which is shifted from an optical axis of the hologram element within a plane approximately perpendicular to the specific direction, incident on the irradiated surface.

12. A projector comprising:
the illumination device according to claim 3; and
a spatial light modulation device that modulates light from the illumination device according to an image signal.

13. The projector according to claim 12,
wherein the illumination device includes:
a first light source portion that supplies coherent light in a first wavelength region;
a second light source portion that supplies coherent light in a second wavelength region different from the first wavelength region;

a hologram element that forms a predetermined illumination pattern on an irradiated surface by diffracting the coherent light from the first light source portion and the second light source portion; and a light separating portion that separates the coherent light in the first wavelength region from the hologram element and the coherent light in the second wavelength region from each other, the spatial light modulation device includes a first spatial light modulation device that modulates the coherent light in the first wavelength region according to an image signal and a second spatial light modulation device that modulates the coherent light in the second wavelength region according to an image signal, the first spatial light modulation device modulates the coherent light in the first wavelength region from the light separating portion and makes the modulated light incident on the light separating portion, the second spatial light modulation device modulates the coherent light in the second wavelength region from the light separating portion and makes the modulated light incident on the light separating portion, and the light separating portion mixes the coherent light in the first wavelength region from the first spatial light modulation device with the coherent light in the second wavelength region from the second spatial light modulation device and makes the mixed light move in the direction of a projected surface.

14. The projector according to claim 13, wherein the illumination device includes a third light source portion that supplies coherent light in a third wavelength region different from the first wavelength region and the second wavelength region, the hologram element forms the illumination pattern by diffracting the coherent light from the third light source portion, the spatial light modulation device includes a third spatial light modulation device modulates the coherent light in the third wavelength region according to an image signal, the light separating portion includes a first light separating portion that separates the coherent light in the first wavelength region and the coherent light in the third wavelength region from the coherent light in the second wavelength region and a second light separating portion that separates the coherent light in the first wavelength region from the coherent light in the third wavelength region, the first spatial light modulation device modulates the coherent light in the first wavelength region from the second light separating portion and makes the modulated light incident on the second light separating portion, the third spatial light modulation device modulates the coherent light in the third wavelength region from the second light separating portion and makes the modulated light incident on the second light separating portion, the second light separating portion mixes the coherent light in the first wavelength region from the first spatial light modulation device with the coherent light in the third wavelength region from the third spatial light modulation device and makes the mixed light move in the direction of the first light separating portion, the second spatial light modulation device modulates the coherent light in the second wavelength region from the first light separating portion and makes the mixed light incident on the first light separating portion, and the first light separating portion mixes the coherent light in the first wavelength region from the second light separating portion, the coherent light in the third wavelength region, and the coherent light in the second wavelength region from the second spatial light modulation device and makes the mixed light move in the direction of the projected surface.

15. The projector according to claim 13, wherein the illumination device includes a third light source portion that supplies coherent light in a third wavelength region different from the first wavelength region and the second wavelength region, the hologram element includes:

a first hologram element that diffracts the coherent light in the first wavelength region and the coherent light in the second wavelength region;

a second hologram element that diffracts the coherent light in the third wavelength region; and a light mixing portion provided at the position where the coherent light in the third wavelength region from the second hologram element is incident, the spatial light modulation device includes a third spatial light modulation device that modulates the coherent light in the third wavelength region from the light mixing portion according to an image signal, the light separating portion separates the coherent light in the first wavelength region from the first hologram element and the coherent light in the second wavelength region from each other, the third spatial light modulation device modulates the coherent light in the third wavelength region from the light mixing portion and makes the modulated light incident on the light mixing portion, and the light mixing portion mixes the coherent light in the first wavelength region from the light separating portion, the coherent light in the second wavelength region, and the coherent light in the third wavelength region from the third spatial light modulation device and makes the mixed light move in the direction of the projected surface.

* * * * *